United States Patent
Downes et al.

(10) Patent No.: US 11,722,741 B2
(45) Date of Patent: Aug. 8, 2023

(54) SYSTEM AND METHOD FOR TRACKING CONTENT TIMELINE IN THE PRESENCE OF PLAYBACK RATE CHANGES

(71) Applicant: Verance Corporation, San Diego, CA (US)

(72) Inventors: Patrick George Downes, San Diego, CA (US); Rade Petrovic, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 17/667,464

(22) Filed: Feb. 8, 2022

(65) Prior Publication Data

US 2022/0312081 A1    Sep. 29, 2022

Related U.S. Application Data

(60) Provisional application No. 63/225,381, filed on Jul. 23, 2021, provisional application No. 63/147,122, filed on Feb. 8, 2021.

(51) Int. Cl.
*H04N 21/8358* (2011.01)
*H04N 21/4147* (2011.01)
(Continued)

(52) U.S. Cl.
CPC ....... *H04N 21/47217* (2013.01); *G06F 11/08* (2013.01); *H04N 21/4147* (2013.01); *H04N 21/8358* (2013.01)

(58) Field of Classification Search
CPC ......... H04N 21/47217; H04N 21/4147; H04N 21/8358; G06F 11/08
See application file for complete search history.

(56) References Cited

U.S. PATENT DOCUMENTS 6,122,610 A    9/2000 Isabelle
6,145,081 A    11/2000 Winograd et al.
(Continued)

FOREIGN PATENT DOCUMENTS

CN    102474658    5/2012
CN    103299648    9/2013
(Continued)

OTHER PUBLICATIONS

"ATSC-3.0 Automatic Content Recognition Watermarking Solutions," ATSC Technology Group, Advanced Television Systems Committee, Inc., Jan. 2014 (6 pages).
(Continued)

*Primary Examiner* — Thai Q Tran
*Assistant Examiner* — Jose M Mesa
(74) *Attorney, Agent, or Firm* — Donald L. Wenskay

(57) ABSTRACT

A system and method for controlling a media player for replacement content, such as dynamic ad insertion. The system tracks video watermarks from a content stream, where the input content timeline is being modified by a user exercising the transport controls of a digital video recorder (DVR). A Detector Engine receives decoded video frames and extracts a time-offset field, a VP1 payload, and a Cyclic Redundancy Check (CRC) field in each video frame. A Content Timeline Tracker monitors and analyzes the output of the Detector Engine to produce a piecewise linear approximation of the content timeline, wherein playback rate changes by a user in an upstream device can be tracked. This enables the playback of auxiliary content which is synchronized to a watermark timeline recovered from the received content in cases where the recovered timeline has a non-linear mapping to real time. When the estimated speed is changing due to user-controlled trick play of recorded content, estimated speed deviates from the user intended (Continued)

speed profile because of imperfect playback of the media player. The system includes additional filtering of estimated speed to produce a Boolean updated speed which is asserted sparsely at estimated control segment endpoints in an attempt to delineate constant slope (constant speed) control segments.

7 Claims, 5 Drawing Sheets

(51) Int. Cl.
    *G06F 11/08*     (2006.01)
    *H04N 21/472*     (2011.01)

(56) References Cited

U.S. PATENT DOCUMENTS

| | | |
|---|---|---|
| 6,175,627 B1 | 1/2001 | Petrovic et al. |
| 6,314,192 B1 | 11/2001 | Chen et al. |
| 6,427,012 B1 | 7/2002 | Petrovic |
| 6,430,301 B1 | 8/2002 | Petrovic |
| 6,490,579 B1 | 12/2002 | Gao et al. |
| 6,556,688 B1 | 4/2003 | Ratnakar |
| 6,577,747 B1 | 6/2003 | Kalker et al. |
| 6,683,958 B2 | 1/2004 | Petrovic |
| 6,757,405 B1 | 6/2004 | Muratani et al. |
| 6,792,542 B1 | 9/2004 | Lee et al. |
| 6,839,673 B1 | 1/2005 | Choi et al. |
| 6,888,943 B1 | 5/2005 | Lam et al. |
| 6,895,430 B1 | 5/2005 | Scheider |
| 6,931,536 B2 | 8/2005 | Hollar |
| 7,024,018 B2 | 4/2006 | Petrovic |
| 7,140,043 B2 | 11/2006 | Choi et al. |
| 7,159,118 B2 | 1/2007 | Petrovic |
| 7,224,819 B2 | 5/2007 | Levy et al. |
| 7,460,667 B2 | 12/2008 | Lee et al. |
| 7,533,266 B2 | 5/2009 | Bruekers et al. |
| 7,707,422 B2 | 4/2010 | Shin et al. |
| 7,779,271 B2 | 8/2010 | Langelaar |
| 7,983,922 B2 | 7/2011 | Neusinger et al. |
| 7,986,806 B2 | 7/2011 | Rhoads |
| 7,991,995 B2 | 8/2011 | Rabin et al. |
| 3,015,410 A1 | 9/2011 | Pelly et al. |
| 3,055,013 A1 | 11/2011 | Levy et al. |
| 3,059,815 A1 | 11/2011 | Lofgren et al. |
| 8,059,858 B2 | 11/2011 | Brundage et al. |
| 8,081,757 B2 | 12/2011 | Voessing et al. |
| 8,085,935 B2 | 12/2011 | Petrovic |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,873 B2 | 9/2012 | Baum et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,467,717 B2 | 6/2013 | Croy et al. |
| 8,479,225 B2 | 7/2013 | Covell et al. |
| 8,483,136 B2 | 7/2013 | Yuk et al. |
| 8,533,481 B2 | 9/2013 | Petrovic et al. |
| 8,538,066 B2 | 9/2013 | Petrovic et al. |
| 8,560,604 B2 | 10/2013 | Shribman et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,666,528 B2 | 3/2014 | Harkness et al. |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,768,714 B1 | 7/2014 | Blesser |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,825,518 B2 | 9/2014 | Levy |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,898,720 B2 | 11/2014 | Eyer |
| 8,923,548 B2 | 12/2014 | Petrovic et al. |
| 8,959,202 B2 | 2/2015 | Haitsma et al. |
| 8,990,663 B2 | 3/2015 | Liu et al. |
| 9,009,482 B2 | 4/2015 | Winograd |
| 9,042,598 B2 | 5/2015 | Ramaswamy et al. |
| 9,055,239 B2 | 6/2015 | Tehranchi et al. |
| 9,106,964 B2 | 8/2015 | Zhao |
| 9,117,270 B2 | 8/2015 | Wong et al. |
| 9,147,402 B2 | 9/2015 | Chen et al. |
| 9,277,183 B2 | 3/2016 | Eyer |
| 10,110,971 B2 | 10/2018 | Winograd et al. |
| 10,236,031 B1 * | 3/2019 | Gurijala ............... G11B 27/323 |
| 2001/0044899 A1 | 11/2001 | Levy |
| 2002/0032864 A1 | 3/2002 | Rhoads et al. |
| 2002/0094082 A1 | 7/2002 | Jones et al. |
| 2002/0138695 A1 | 9/2002 | Beardsley et al. |
| 2003/0055979 A1 | 3/2003 | Cooley |
| 2003/0065739 A1 | 4/2003 | Shnier |
| 2004/0202324 A1 | 10/2004 | Yamaguchi et al. |
| 2005/0123169 A1 | 6/2005 | Wendt |
| 2005/0182792 A1 | 8/2005 | Israel et al. |
| 2006/0047704 A1 | 3/2006 | Gopalakrishnan |
| 2006/0053292 A1 | 3/2006 | Langelaar |
| 2006/0083242 A1 | 4/2006 | Pulkkinen |
| 2006/0115108 A1 | 6/2006 | Rodriquez et al. |
| 2006/0239503 A1 | 10/2006 | Petrovic et al. |
| 2007/0003103 A1 | 1/2007 | Lemma et al. |
| 2007/0039018 A1 | 2/2007 | Saslow et al. |
| 2007/0208744 A1 | 9/2007 | Krishnaprasad et al. |
| 2007/0250560 A1 | 10/2007 | Wein et al. |
| 2008/0297654 A1 | 12/2008 | Verberkt et al. |
| 2008/0301304 A1 | 12/2008 | Chitsaz et al. |
| 2009/0010487 A1 | 1/2009 | Maeno |
| 2009/0060055 A1 | 3/2009 | Blanchard et al. |
| 2009/0089078 A1 | 4/2009 | Bursey |
| 2009/0158318 A1 | 6/2009 | Levy |
| 2009/0319639 A1 | 12/2009 | Gao et al. |
| 2010/0023489 A1 | 1/2010 | Miyata et al. |
| 2010/0054531 A1 | 3/2010 | Kogure et al. |
| 2010/0063978 A1 | 3/2010 | Lee et al. |
| 2010/0131461 A1 | 5/2010 | Prahlad et al. |
| 2010/0172540 A1 | 7/2010 | Davis et al. |
| 2010/0174608 A1 | 7/2010 | Harkness et al. |
| 2010/0281142 A1 | 11/2010 | Stoyanov |
| 2011/0004897 A1 | 1/2011 | Alexander et al. |
| 2011/0088075 A1 | 4/2011 | Eyer |
| 2011/0099594 A1 | 4/2011 | Chen et al. |
| 2011/0103444 A1 | 5/2011 | Baum et al. |
| 2011/0161086 A1 | 6/2011 | Rodriguez |
| 2011/0188700 A1 | 8/2011 | Kim et al. |
| 2011/0252342 A1 | 10/2011 | Broman |
| 2011/0261667 A1 | 10/2011 | Ren et al. |
| 2011/0286625 A1 | 11/2011 | Petrovic et al. |
| 2011/0293090 A1 | 12/2011 | Ayaki et al. |
| 2011/0320627 A1 | 12/2011 | Landow et al. |
| 2012/0023595 A1 | 1/2012 | Speare et al. |
| 2012/0072731 A1 | 3/2012 | Winograd et al. |
| 2012/0102304 A1 | 4/2012 | Brave |
| 2012/0110138 A1 | 5/2012 | Zhang |
| 2012/0117031 A1 | 5/2012 | Cha et al. |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |

(56) References Cited

U.S. PATENT DOCUMENTS

| | | |
|---|---|---|
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2012/0315011 A1* | 12/2012 | Messmer ............... H04N 7/08 386/230 |
| 2013/0007462 A1 | 1/2013 | Petrovic et al. |
| 2013/0007790 A1 | 1/2013 | McMillan et al. |
| 2013/0024894 A1 | 1/2013 | Eyer |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0114848 A1 | 5/2013 | Petrovic et al. |
| 2013/0117571 A1 | 5/2013 | Petrovic et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0159546 A1 | 6/2013 | Thang et al. |
| 2013/0171926 A1 | 7/2013 | Perret et al. |
| 2013/0246643 A1 | 9/2013 | Luby et al. |
| 2014/0037132 A1 | 2/2014 | Heen et al. |
| 2014/0047475 A1 | 2/2014 | Oh et al. |
| 2014/0059591 A1 | 2/2014 | Terpstra et al. |
| 2014/0067950 A1 | 3/2014 | Winograd |
| 2014/0068686 A1 | 3/2014 | Oh et al. |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0115644 A1 | 4/2014 | Kim et al. |
| 2014/0196071 A1 | 7/2014 | Terpstra et al. |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2015/0030200 A1 | 1/2015 | Petrovic et al. |
| 2015/0043728 A1 | 2/2015 | Kim et al. |
| 2015/0043768 A1 | 2/2015 | Breebaart |
| 2015/0121534 A1 | 4/2015 | Zhao et al. |
| 2015/0156536 A1 | 6/2015 | Kim et al. |
| 2015/0170661 A1 | 6/2015 | Srinivasan |
| 2015/0229979 A1 | 8/2015 | Wood et al. |
| 2015/0261753 A1 | 9/2015 | Winograd et al. |
| 2015/0264429 A1 | 9/2015 | Winograd et al. |
| 2015/0296274 A1 | 10/2015 | Good et al. |
| 2015/0324947 A1 | 11/2015 | Winograd et al. |
| 2015/0340045 A1 | 11/2015 | Hardwick et al. |
| 2016/0055606 A1 | 2/2016 | Petrovic et al. |
| 2016/0055607 A1 | 2/2016 | Petrovic et al. |
| 2016/0057317 A1 | 2/2016 | Zhao et al. |
| 2016/0148334 A1 | 5/2016 | Petrovic et al. |
| 2016/0150297 A1 | 5/2016 | Petrovic et al. |
| 2016/0165297 A1* | 6/2016 | Jamal-Syed ..... H04N 21/43078 386/201 |
| 2016/0182973 A1 | 6/2016 | Winograd et al. |
| 2016/0241932 A1 | 8/2016 | Winograd et al. |
| 2017/0251282 A1 | 8/2017 | Winograd et al. |
| 2018/0192163 A1 | 7/2018 | Winograd et al. |

FOREIGN PATENT DOCUMENTS

| | | |
|---|---|---|
| EP | 1474924 A2 | 11/2004 |
| EP | 2439735 A1 | 4/2012 |
| EP | 2489181 A2 | 8/2012 |
| EP | 2899720 A1 | 7/2015 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 10201016712 | 2/2011 |
| KR | 1020120083903 | 7/2012 |
| KR | 1020120128149 | 11/2012 |
| KR | 20130078663 | 7/2013 |
| KR | 1020130074922 | 7/2013 |
| KR | 101352917 B1 | 1/2014 |
| KR | 10201424049 | 7/2014 |
| WO | 00059148 A1 | 10/2000 |
| WO | 2005017827 | 2/2005 |
| WO | 2005038778 | 4/2005 |
| WO | 2006051043 | 5/2006 |
| WO | 2009031082 | 3/2009 |
| WO | 2010073236 | 7/2010 |
| WO | 2010135687 | 11/2010 |
| WO | 2011046590 A2 | 4/2011 |
| WO | 2011116309 | 9/2011 |
| WO | 2012177126 A1 | 12/2012 |
| WO | 2012177874 A2 | 12/2012 |
| WO | 2013025035 A2 | 2/2013 |
| WO | 2013163921 | 11/2013 |
| WO | 2015138798 | 9/2015 |
| WO | 2015168697 | 11/2015 |
| WO | 2015174086 | 11/2015 |
| WO | 2016028934 | 2/2016 |
| WO | 2016028936 | 2/2016 |
| WO | 2016029055 | 2/2016 |
| WO | 2016086047 A1 | 6/2016 |

OTHER PUBLICATIONS

Aris Technologies, Inc. "Audio Watermarking System to Screen Digital Audio Content for LCM Acceptance," May 1999 (17 pages).

Bangaleea, R., et al., "Performance improvement of spread spectrum spatial-domain watermarking scheme through diversity and attack characterisation," IEEE Africon, pp. 293-298, 2002.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

International Search Report and Written Opinion dated Aug. 13, 2015 for International Application No. PCT/US2015/029097, filed May 4, 2015 (14 pages).

International Search Report and Written Opinion dated May 28, 2015 for International Application No. PCT/US2015/020282, filed Mar. 12, 2015 (7 pages).

International Search Report and Written Opinion dated Dec. 7, 2015 for International Application No. PCT/US2015/045960, filed Aug. 19, 2015 (14 pages).

International Search Report and Written Opinion dated Jan. 28, 2016 for International Application No. PCT/US2015/045964, filed Aug. 19, 2015 (8 pages).

International Search Report and Written Opinion dated Mar. 15, 2016 for International Application No. PCT/US2015/062514, filed Nov. 24, 2015 (10 pages).

Kalker, T., et al., "System issues in digital image and video watermarking for copy protection," Proc. IEEE Int. Conf. on Multimedia Computing and Systems, pp. 562-567, Jun. 1999.

Kirovski, D., et al., "Multimedia content screening using a dual watermarking and fingerprinting system," Proceedings of the tenth ACM international conference, pp. 372-381, 2002.

Kirovski, D., et al., "Multimedia content screening using a dual watermarking and fingerprinting system," Multimedia '02 Proceedings of the tenth ACM international conference on Multimedia, 2002 (11 pages).

Verance Corporation, "Confirmedia," PowerPoint presentation made to National Association of Broadcasters, Apr. 24, 2001 (40 pages).

Zhao, J., "A WWW service to embed and prove digital copyright watermarks," Proc. European Conf. on Multimedia Applications, Services and Techniques (ECMAST'96), May 1996 (15 pages).

(56) References Cited

OTHER PUBLICATIONS

Zhao, J., "Applying digital watermarking techniques to online multimedia commerce," Proc. Int. Conf. on Imaging Science, Systems and Applications (CISSA'97), Jun./Jul. 1997 (7 pages).
International Search Report and Written Opinion dated Jan. 21, 2016 for International Application No. PCT/US2015/046166, filed Aug. 20, 2015 (8 pages).
International Search Report and Written Opinion dated Apr. 12, 2016 for International Application No. PCT/US2015/066872, filed Dec. 18, 2015 (7 pages).
Office action dated Jun. 10, 2016 for Korean Patent Application No. 10-2016-7002291 (19 pages).
Office action dated Jun. 10, 2016 for Korean Patent Application No. 10-2016-7002289 (11 pages).
Office action dated Nov. 30, 2016 for Korean Patent Application No. 10-2016-7002289 (4 pages).
Office action dated Oct. 9, 2018 for Chinese Patent Application No. 201580019496.X (8 pages).
Extended European Search Report dated Nov. 21, 2017 for European Application No. 15785628.7 (7 pages).

* cited by examiner

SYSTEM AND METHOD FOR TRACKING CONTENT TIMELINE IN THE PRESENCE OF PLAYBACK RATE CHANGES

REFERENCE TO RELATED APPLICATIONS

This application claims priority to U.S. Provisional Patent Application No. 63/147,122, filed Feb. 8, 2021, and U.S. Provisional Patent Application No. 63/225,381, filed Jul. 23, 2021, the entirety of which are incorporated by reference.

FIELD OF INVENTION

The present invention generally relates to watermarking digital content and more particularly to using watermarks to track content timeline in the presence of playback rate changes.

BACKGROUND

This section is intended to provide a background or context to the disclosed embodiments that are recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

A video watermarking system which embeds ancillary information into a video signal is found in the ATSC standard A/335. In such systems it is sometimes necessary to playback auxiliary content which is synchronized to a watermark timeline recovered from the received content in cases where the recovered timeline has a non-linear mapping to real time.

SUMMARY OF THE INVENTION

Figure 1:
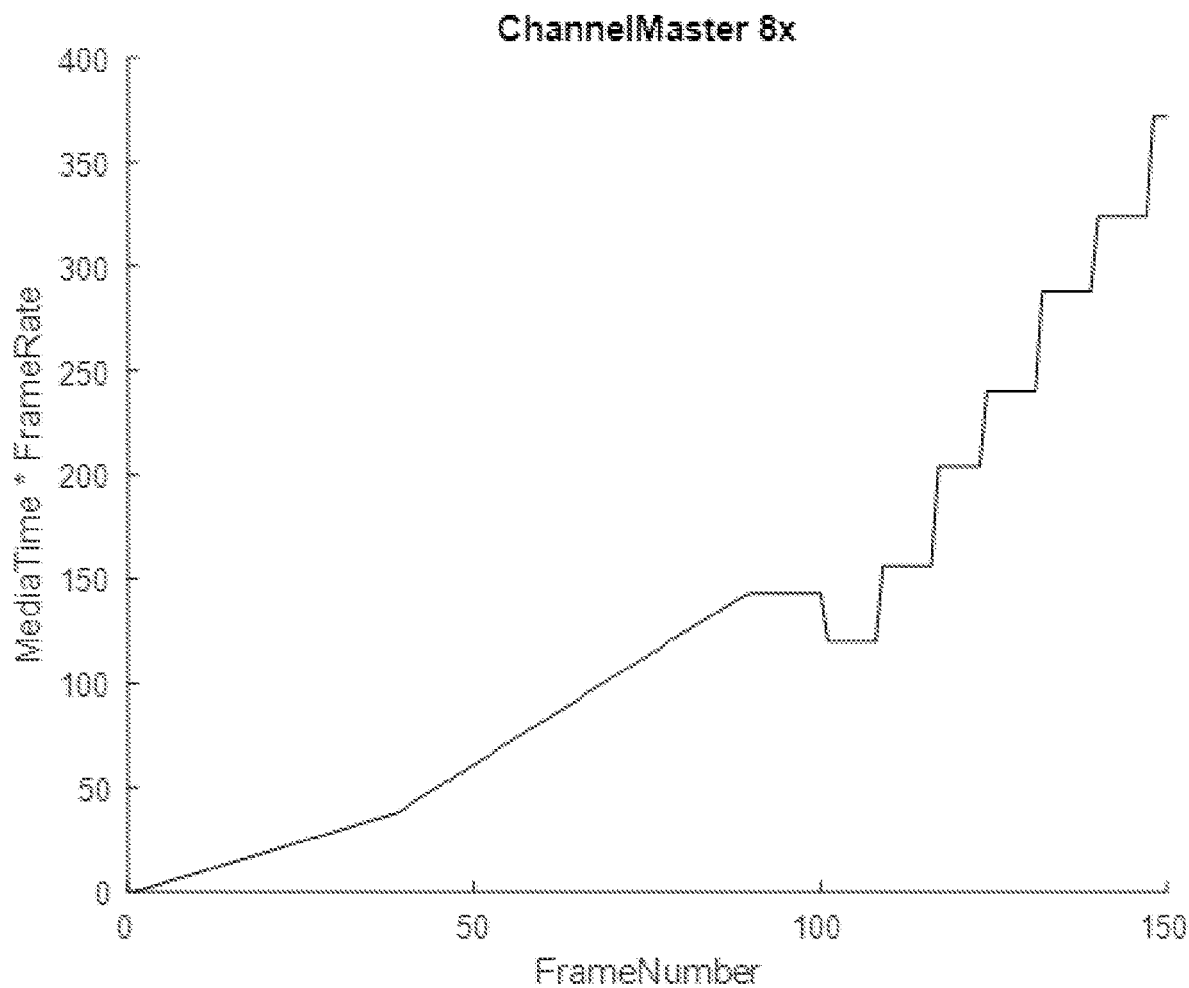
FIG. 1 Illustrates exemplary non-linear timelines resulting from the user's operation of STB remote control trickplay functions in response to a sequence of user commands in accordance with an embodiment of the disclosure.

This section is intended to provide a summary of certain exemplary embodiments and is not intended to limit the scope of the embodiments that are disclosed in this application.

Disclosed embodiments relate to method for synchronizing auxiliary content to a watermark timeline recovered from a received content when the recovered timeline has a non-linear mapping to real time. The method includes receiving video content having a video watermark embedded therein and decoding video frames from the received video content. A Detector Engine is used to receive the decoded video frames and extract a time-offset field, a VP1 payload, and a Cyclic Redundancy Check (CRC) field in each video frame. A Content Timeline Tracker is used to monitor and analyze the output of the Detector Engine, to produce a piecewise linear approximation of the content timeline, wherein the playback rate changes by a user in an upstream device can be tracked, thereby enabling the playback of auxiliary content which is synchronized to a watermark timeline recovered from the received content when the recovered timeline has a non-linear mapping to real time.

These and other advantages and features of disclosed embodiments, together with the organization and manner of operation thereof, will become apparent from the following detailed description when taken in conjunction with the accompanying drawings.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Introduction

This disclosure describes the logic that uses video watermarks specified in the ATSC 3.0 Standards, Video Watermark Emission (A/335), Doc. A335:2016, 20 Sep. 2016, which is incorporated by reference, and Content Recovery in Redistribution Scenarios (A/336), Doc. A/336:2019, 3 Oct. 2019, which is incorporated by reference, in order to detect and measure trick-play action on upstream devices such as Set Top Box (STB), such as pause, speed-up, slow-down and skip. In particular it is based on detecting eVP1 messages specified in the A/336 standard, which comprises 8-bit time_offset field, 50-bit VP1 payload and 32-bit Cyclic Redundancy Check (CRC) field in each video frame.

The time_offset field is incremented by one every 1/30 s within a message group that lasts 1.5 s, i.e., it can have values 0, 1, 2, . . . 44 within each message group. The VP1 payload (P) is divided into four fields: Domain Type (DT), Server Code (SC), Interval Code (IC), and Query Flag (QF). DT is a one-bit field (0="small domain", 1="large domain"). For "small domain", the SC field consists of 31 bits and the IC field consists of 17 bits. For "large domain", the SC field consists of 23 bits and the IC field consists of 25 bits. The QF field is always one bit, and its toggling signals a dynamic event that requires new signaling recovery. The IC field is incremented by one for each subsequent message group.

The CRC field is used to confirm correctness of the extracted data, as is well known to those skilled in the art. It is assumed that there is a detector engine that will receive decoded video frames and extract 8-bit time_offset field, 50-bit VP1 payload and 32-bit CRC field in each video frame based on A/335 and A/336. The details of detector engine design are not part of this disclosure.

CRC Matching

The CRC matching logic compares the CRC fields extracted from the current frame with CRC field extracted from the previous frame and sets the CRC repetition flag to TRUE if they match and otherwise sets it to FALSE. This process is done regardless of whether the extracted CRC field matches the calculated CRC field based on the extracted data. Even if extracted CRC field may have bit errors and the actual data cannot be retrieved, we still want to know if the consecutive CRC fields are repeated. This information can be later used to discriminate between actual payload repetition, such as time_offset repetition in high frame-rate video or fragment repetition, or frame repetition in pause-and-seek playback rate change, skip and pause, as described below.

Content Timeline Tracker

The Content Timeline Tracker ("Tracker") monitors the output of the detector engine, and analyzes frame_counter, interval_code, time_offset, and CRC repetition flag values and to produce estSpeed, a piecewise linear approximation of the content timeline which can track playback rate changes initiated by a user on an upstream device (e.g., STB).

Overview

Some applications require playback of auxiliary content which is synchronized to the watermark timeline recovered from the main content. For normal viewing the recovered timeline is real-time, meaning that an elapsed interval of media time occurs in an equal duration interval of real time. Other times, such as when the user is controlling playback of main content using 'trick play', the recovered timeline has a non-linear mapping to real time.

To play content, Media Player APIs typically expose a command to start (or continue) to play from a specific frame at a specific speed. A sufficiently fast enough player could track, frame-by-frame, the recovered timeline in all modes of play, but most current players cannot respond quickly enough to be able to precisely seek to and render a frame within one frame's duration.

A goal of the Tracker is to quickly recognize where playback rate changes are initiated by the user, and provide a piecewise-linear estimate of the playback speed which can then be used in controlling a replacement media player, minimizing the number of seek commands required to track the main content.

TABLE

Tracker Details
Tracker inputs and outputs are summarized
in the Tracker Details Table below.

| Parameter Name | Input/Output |
|---|---|
| Frame Counter (Fc) | Input |
| Interval Code (P) | Input |
| time_offset (To) | Input |
| CRC repetition flag (crf) | Input |
| Frame rate (fps) | Input |
| estSpeed | Output |
| fSpeedUpdated | Output |

TABLE

Tracker Variables

| Parameter Name | Type | Description |
|---|---|---|
| controlSegmentStartMediaTime | Float | Media time of current Control Segment start. Init value = 0.0 |
| controlSegmentStartClockTime | Float | Clock time of current Control Segment start |
| currentMediaTime | Float | Media time as calculated using ic and To. Unit: Seconds |
| prevMediaTime | Float | Value of currentMediaTile last time tracker( ) was called. Unit: Seconds |
| deltaMediaTime | Float | Time since last time tracker( ) was called. Unit: Seconds |
| currentClockTime | Float | Local receiver clock derived from counting samples. Unit: Seconds |
| prevClockTime | Float | Value of currentClockTime last time tracker( ) was called. Unit: Seconds |
| prevOffset | Int | Value of time_offset from previous call to track( ) |
| pauseCounter | Int | Counts successive frames with same media time. |
| estSpeed | Float | Estimated playback speed. Init value = 0.0 |
| fSpeedUpdated | boolean | true if a new control segment was detected during the last call to track( ). Init value = false. |

TABLE

Tracker Configuration Constants

| Parameter Name | Type | Description |
|---|---|---|
| pauseCountThreshold | Int | = 11; make this larger than the largest number of frames encountered during pause-seek trick play. |
| stableStateCount | Int | = 5; stability threshold for counting pause or 1x events. |
| speedLimit | Float | = 32; clip speed estimates to +/− speedLimit |
| speedRatioReportingThreshold | Float | = 1.005; estSpeed ratio change reporting threshold |
| ToQuantization | Float | = 1/30 sec; quantization of T0 during embedding |

Control Segments

A Control Segment represents a period of time between two upstream user transport control commands which modify playback speed. The media timeline detected with the watermark might be a smooth rendition of the user's command (e.g., 2× resulting in regular frame decimation), or it might be a pause-seek stepwise approximation to the user's command (e.g., 32× in FIG. 1).

The Control Segment is initialized with the currentMediaTime and currentClockTime.

```
func controlSegmentInit( ) {
    csStartMediaTime = currentMediaTime
    csStartClockTime = currentClockTime
}
```

An initial speed estimate uses the most recent deltaMediaTime.

```
func getInitJumpingSpeed( ) -> Float {
    let estSpeed = deltaMediaTime / frameDurationSec
    return min(max(estSpeed,-c.speedLimit),c.speedLimit)
}
```

Occasionally the speedEstimate is updated in the middle of a Control Segment as the slope of the expanding control segment line becomes a better estimator for media speed. getCurrentCSSpeed( ) calculates the current slope and clips the value to speedlimit.

```
func getCurrentCSSpeed( ) -> Float {
    let speed = (currentMediaTime - csStartMediaTime) /
(currentClockTime - csStartClockTime)
    let clippedSpeed = min(max(speed,-speedLimit),
speed Limit)
        return clippedSpeed
}
```

Tracker States

The Tracker implements a state machine to help recognize patterns in the recovered timeline and estimate the control segment boundaries. The states are shown in the tracker States Table below.

| State Name | Description |
| --- | --- |
| Init | Initial tracker state |
| Paused | Paused |
| PauseSeek | Pause-Seek |
| OneXOnset | First 1x frame spacing detected. This state provides a one frame delay before making decision on next state |
| OneXPlay | Playback at speed less than or equal to 2.0. which might include some individual repeated or skipped frames. |
| JumpOnset | First Jumping spacing detected (not paused and not 1x). This state provides a one frame delay before making decision on next state |
| Jumping | In the middle of a sequence of non-pause, non-1x play spaced frames |

Tracker Events/Tracker Main track( ) is called with parameters frame_counter, interval_counter, time_offset and CRC repetition flag. It generates events which drive the Tracker state machine. The events are:

| Event Name | Description |
| --- | --- |
| pauseDetected( ) | |
| play1xDetected( ) | |
| discontinuityDetected( ) | | track( ) is called once for every detected frame.

Two successive calls to tracker with the same IC and time_offset might mean that content is paused, but this can also happen for frame rates higher that 30 fps because time_offset is quantized to $1/30$ sec (T0Quantization). These duplicate frames caused by To quantization should be discarded by the tracker, and this is done by looking at the deltaclockTime to determine if two successive calls are spaced less than $1/30$ sec. Note that deltaMediaTime might not be zero even if two successive calls are spaced closer than $1/30$ sec because of upstream trick play, and these samples should not be discarded.

Two successive calls to Track( ) might be spaced further than 1/fps seconds apart if intervening frames did not have time_offset available. The number of skipped frames is calculated in skippedFrames and used to test for 1× play speed.

The CRC repetition flag crf is used to indicate paused state when the time_offset is not available; in this case the previous value of the time_offset is used.

When the fps is different than 1/ToQuantization, there will be an error in the calculation of delta media time. This kind of jitter is tolerated using a threshold in the calculation:

frameJitterThresholdSec=0.99/fps

Pseudo-code for the track( ) function of the Tracker:

```
func track(frame_counter:Int, ic:Int, time_offset:int,
crf:Boolean, fps:Float) {
    trackingTimelineTimetick(frame_counter)
    if ((time_offset != -1) && (ic != -1)) || crf {
        if crf {
        let currentOffset = prevOffset
        if (ic != -1) {
            prevIC = ic
        } else {
            ic = prevIC
        }
        else {    //(time_offset != -1) && (ic != -1)
            let currentOffset = time_offset
            prevOffset = time_offset
            prevIC = ic
        }
        let clockTime = frame_counter / fps
        let mediaFrameOffsetTime = (ic * 1.5) + (currentOffset *
ToQuantization )
        deltaClockTime = clockTime - prevClockTime
        deltaMediaTime = mediaFrameOffsetTime - prevMediaTime
        if ! ((deltaClockTime < ToQuantization) &&
(deltaMediaTime == 0)) {
            skippedFrames = Int((deltaClockTime * fps).rounded( ))
            currentClockTime = clockTime
            prevClockTime = currentClockTime
            currentMediaTime = mediaFrameOffsetTime
            prevMediaTime = currentMediaTime
            if deltaMediaTime == 0 {
                pauseDetected( )
            } else if deltaMediaTime < skippedFrames *
frameDurationSec + frameJitterThresholdSec &&
                deltaMediaTime > skippedFrames * frameDurationSec
- frameJitterThresholdSec {
                play1xDetected( )
            } else {
                discontinuityDetected( )
            }
            trackingTimelineUpdate( )
        }
    }
}
```

Pause Detected Event Handler

This event is triggered when successive frames show no advance in media time. This could be because the content is paused, or it might part of content playback at speed not equal 1x, such as part of a 'Pause-Seek' operation for speed >2.0, or part of frame interpolation for speed <1.0.

A goal is to recognize as quickly as possible that pause is occurring to ensure that a tracking media player is responsive to user commands.

The main decision to be made in the event handlers is whether to start a new or update the current control segment. For example, new control segments should not be started in the middle of a sequence of pause-seeks, but the existing speed estimate should be updated.

```
func pauseDetected( ) {
    if state == .JumpOnset {
        if prevState == .PauseSeek { // in trickplay. Dont reanchor control segment; just update speed
            setEstSpeed(getCurrentCSSpeed( ))
        } else { // This is a new jump, so reanchor control segment;
            setEstSpeed(getInitJumpingSpeed( ))
            controlSegmentInit( )
        }
        pauseCounter = 0
        state = .PauseSeek
    } else if (state == .PauseSeek) || (state == .Jumping) {
        // This might be a real pause, or it might be part of a
        // pause-seek: Only update if real pause
        if pauseCounter > pauseCountThreshold {
            setEstSpeed(0)
            controlSegmentInit( )
            state = .Paused
            pauseCounter = 0;
        }
    } else if state == .OneXPlay || state .OneXOnset {
        // Start a new control segment only if coming from continuous
        // (non-jumping) 1x playback . Ignore transient duplicated frames during jumping.
        if pauseCounter > stableStateCount || onexCounter > stableStateCount {
            setEstSpeed(1) // Do not zero speed entering pause-seek. This is not a real pause.
            controlSegmentInit( )
            state = .PauseSeek
            pauseCounter = 0;
        } else { // This could be oscilation between pause and 1x seen in speeds < 1
            setEstSpeed(getCurrentCSSpeed( ))
        }
    } else { // state == .Paused or state == .Init
        state = .Paused
        if estSpeed != 0 {
            setEstSpeed(0.0)
        }
    }
    discCounter = 0;
    pauseCounter = pauseCounter + 1
    onexCounter = 0
}
``` play1x Detected Event Handler play1x Detected might be part of normal 1x play, or it might be part of a sequence of frames where playback speed is <2x. A goal is to recognize as quickly as possible that normal 1x play is occurring to ensure that a tracking media player is responsive to user commands.

```
func play1xDetected( ) {
    if state == .JumpOnset {
        state = .OneXOnset
    } else if state == .Jumping {
        controlSegmentInit( )
        state = .OneXOnset
    } else if state == .OneXOnset {
        setEstSpeed(1.0)
        controlSegmentInit( )
        state = .OneXPlay
    } else if state == .Paused || state == .Init {
        setEstSpeed(1.0)
        controlSegmentInit( )
        state = .OneXPlay
```

```
    } else if state == .PauseSeek { // might be <2x, so don't reanchor segment
        state = .OneXOnset
    } else if state == .OneXPlay {
        if onexCounter == stableStateCount { // Fail safe (in presense of CRC errors).
            setEstSpeed(1)
            controlSegmentInit( )      // Establish 1x control segment
        }
    }
    discCounter = 0;
    pauseCounter = 0;
    onexCounter = onexCounter + 1
}
```

Discontinuity Detected Event Handler

A discontinuity is any jump in the recover timeline, which is not a pause or frames spaced 1/fps apart. These might be part of a pause-seek (a 'big' jump below), or result from playback speeds estSpeed <2.0 && estSpeed >1.0.

```
func discontinuityDetected( ) {
    if state == .Paused || state .PauseSeek || state .Init
    {
        // first jump afer a pause; wait for next frame to establish slope for estSpeed
        // (esp useful for 1x play after skip)
        state = .JumpOnset
    } else if state == .JumpOnset {
        state = .Jumping
        setEstSpeed(getInitJumpingSpeed( ))
        controlSegmentInit( )
    } else if state == .OneXPlay || state == .OneXOnset {
        if abs(deltaMediaTime) > 2.2 * skippedFrames * frameDurationSec || disCounter > 2 { // if this is a big skip
            controlSegmentInit( )
            state = .JumpOnset // wait a frame before tsUpdated to get better speed estimate
        } else { // a small jump could be part of speed < 2, so stay in .OneXPlay
            setEstSpeed(getCurrentCSSpeed( ))
        }
    } else if state == .Jumping {
        if abs(deltaMediaTime) > 2.2 * Float(skippedFrames) * frameDurationSec { // if this is a big skip
            state = .JumpOnset
        } // else, don't controlSegmentInit via .JumpOnset
        setEstSpeed(getCurrentCSSpeed( ))
    }
    discCounter = discounter + 1*
    pauseCounter = 0;
    onexCounter = 0
}
```

Tracking Timeline estSpeed represents the slope of an idealized control segment. In reality, it is a noisy signal that is influenced by the imperfect nature of trick play media transports. A trackingTimeline is created with logic to try to remove this noise and produce sparsely spaced fSpeedUpdated events that delineate constant slope (constant speed) control segments.

The timeline is parametrized by att. speed and tt.media-Time, and can be quantized in time to correspond to the underlying video frame rate. For each processed video frame, trackingTimelineTimetick( ) is called to update the timeline by extrapolating the mediaTime using tt.speed. The timeline can also be resynchronized to the video watermark timeline in trackingTimelineUpdate( ) which is also called every processed video frame. trackingTimelineUpdate( )

selectively calls trackingTimelineSetimeAndSpeed (time, speed) which updates the tracking timeline and sets the fSpeedUpdated Boolean.

trackingTimelineUpdate ( ) does not always update tt.speed and tt.mediaTime and uses thresholding logic and other heuristics to avoid too frequent updates to fSpeedUpdated. This can be important if, for example, fSpeedUpdated is used to trigger the seeking of a media player which playing alternate content synchronized to the incoming watermarked content.

trackingTimelineUpdate ( ) analyzes the differences between tt. speed and the estSpeed which is estimated from the recovered watermarks. If there is any transition between pause and play (i.e., if (estSpeed==0.0||estSpeed=1.0||tt.speed=0||tt.speed=1.0) && (tt.speed~=estSpeed), the tracking timeline is immediately updated.

If tt.speed and estSpeed have opposite signs, the tracking timeline is also immediately updated so that overshoot is reduced in tracking devices. If the signs are the same then the tracking timeline is only updated if the ratio of tt.speed and estSpeed is outside of a thresholded window. This avoids constant fSpeedUpdated triggers that might be due to small estimation errors in estSpeed and other system noise.

If none of the speed analysis conditions are true, trackingTimelineUpdate ( ) analyzes the differences between tt.mediaTime and the currentMediaTime. If this difference is above a threshold, then the tracking timeline is updated. The threshold is adjusted based on the estSpeed, so that there is a greater tolerance to time errors when operating at fast trick play speeds. In most cases the tracking timeline is updated using the currentMediaTime and estSpeed; however, if such an update would reverse the sign of the speed when the time difference is relatively small and the difference is diverging, this is recognized as normal tracking of a pause-seek trick play source, so the tracking timeline is updated to pause at currentMediaTime to wait for the next seek in the pause seek sequence.

TABLE

Tracking Timeline Variables

| Parameter Name | Type | Description |
|---|---|---|
| tt.mediaTime | Float | Current time along the tracking timeline |
| tt.speed | Float | Current speed along the tracking timeline |
| tt.currentMediaTimeError | Float | Difference between the tt.mediaTime and estSpeed |
| tt.prevFrameNumber | Int | curentFrameNumber last time trackingTimelineTimeTick was called |
| tt.prevMediaTimeError | Float | Difference between the tt.mediaTime and estSpeed as measured in the last frame |

TABLE

Trackingrinteline Constants

| Parameter Name | Type | Description |
|---|---|---|
| tt.timeErrorThreshold | Float | = 0.5 Seconds (mediaTime) error before issuing a correction in jump mode. Smaller number results in less error but more speed updates |

TimeTracker Functions

```
func trackingTimelineInit( ) {
    tt.speed = 0.0
    tt.mediaTime = 0.0
        tt.currentMediaTimeError = 0.0
        tt. prevMediaTimeError = 0.0
    tt.prevFrameNumber = 0
}
func trackingTimelineTimetick(currentFrameNumber) {
    let skippedFrames = currentFrameNumber - tt.prevFrameNumber
    tt.prevFrameNumber = currentFrameNumber
    tt.mediaTime = tt.mediaTime + tt.speed * skippedFrames * frameDurationSec
    tt.prevMediaTimeError = tt.currentMediaTimeError
    tt.currentMediaTimeError = tt.mediaTime - currentMediaTime
    fSpeedUpdated = 0
}
func trackingTimelineSetTimeAndSpeed(time, speed) {
    tt.speed = speed
    tt.mediaTime = time
    fSpeedUpdated = 1
}
func trackingTimelineUpdate( ) {
    fCorrected = false;
    // First check speed difference
    if (estSpeed == 0.0 | | estSpeed == 1.0 | | tt.speed == 0 | | tt.speed == 1.0) && ( tt.speed ~= estSpeed ) {
        trackingTimelineSetTimeAndSpeed(currentMediaTime, estSpeed)
            fCorrected = true;
    } elseif sign(tt.speed) == sign(estSpeed) ) {
        if ( tt.speed ~= estSpeed ) {
            if abs(estSpeed) > abs(tt.speed) {
                ratio = tt.speed/ estSpeed
            } else {
                ratio = estSpeed/tt.speed
            }
            if ratio < 0.5 {
                trackingTimelineSetTimeAndSpeed
    (currentMediaTime, estSpeed)
                fCorrected = true
            }
        }
    } elseif tt.speed * state.estSpeed ~= 0 // // update if speeds are opposite signs and non-zero
            trackingTimelineSetTimeAndSpeed
(currentMediaTime, estSpeed)
            fCorrected = true
    }
    // Second, check time difference
    if fCorrected == false {
        thresh = tt.timeErrorThreshold
        if abs(estSpeed) > 2 {
            thresh = tt.timeErrorThreshold * abs(estSpeed)
        }
        if abs(tt.currentMediaTimeError) >= abs(deltaMediaTime) &&
            abs(tt.currentMediaTimeError) >= thresh {
            // do not make small direction reversals when correcting
            if sign(tt.currentMediaTimeError) ~= sign(state.estSpeed) | |
                sign(tt.speed) ~= sign(state.estSpeed) {
                // in this case a correction will not reverese direction
                trackingTimelineSetTimeAndSpeed
(currentMediaTime, estSpeed)
            } elseif abs(tt.currentMediaTimeError) > abs(tt.prevMediaTimeError) &&
                (abs(tt.currentMediaTimeError)/abs(state.estSpeed)) < 5
                // in this case a correction will reverse directions,
                // so if were diverging pause media player at its current position
                trackingTimelineSetTimeAndSpeed
(currentMediaTime, 0)
            } else {
```

-continued

| TimeTracker Functions |
| --- |
| trackingTimelineSetTimeAndSpeed<br>(currentMediaTime, estSpeed)<br>    }<br>  }<br> }<br>} |

Trickplay Timeline Examples

Examples of non-linear timelines resulting from the user's operation of STB remote control trickplay functions are shown below. These are selected from a set of test vectors that can be used to validate implementations of this algorithm.

In these examples, the user input is a sparse sequence of button pushes to change playback speed or skip through content. The STBs main media player responds by seeking in the content and using custom frame decimation and interpolation to play the content at the commanded speed. A typical algorithm is 'Pause-Seek', where a frame is repeated ('Pause') while the player seeks to an appropriate frame to play next.

1×→2×→8× Playback

FIG. 1 shows the results of a sequence of user commands to a ChannelMaster DVR: starting 1× playback, then hitting the '>>' button at frame 40 results in 2x playback, until frame 90, when a the second '>>' command results in a brief pause, a slight regression in time, then a succession of pause-seek intervals. The pause-seek interval timing is regularly spaced, with slight variations (e.g. Pause for 6 frames then a jump of 36 frames). Even though the display overlay says '8×' the actual average is approx. 5.4×.

Figure 2:
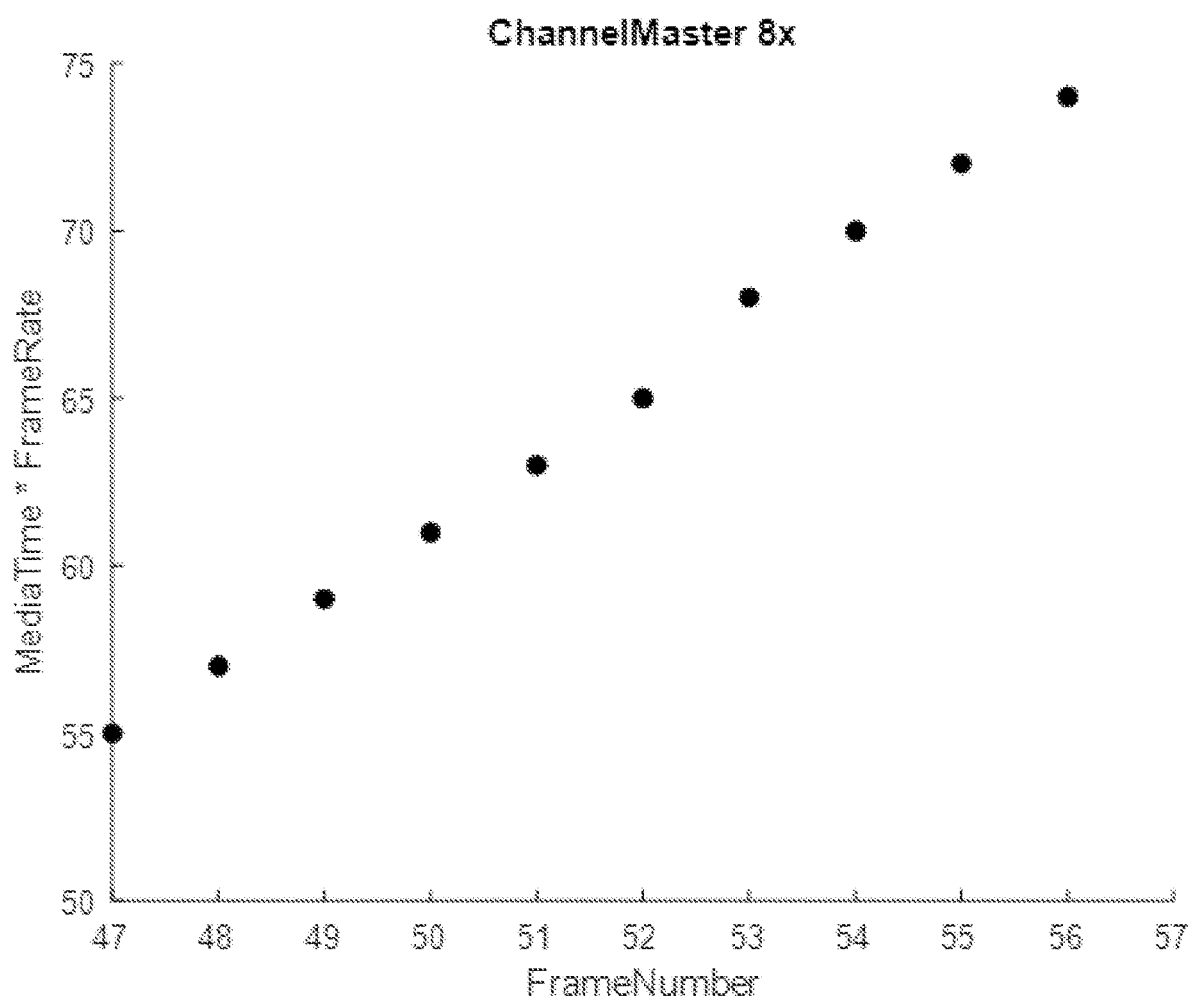
FIG. 2 Illustrates exemplary non-linear timelines resulting from the user's operation of STB remote control trickplay functions showing that occasionally two input frames are skipped resulting in an overall rate of ~2.08× as shown in Figure FIG. 3 Illustrates exemplary non-linear timelines resulting from the user's operation of STB remote control trickplay functions in response to starting 1× playback, then hitting the '>>' button three times in succession, resulting in '1×', '2×', '8×', '32×' playback in accordance with an embodiment of the disclosure.

A closer look at the 2× playback section in FIG. 1 shows that it is not simply discarding every other frame. Occasionally two input frames are skipped resulting in an overall rate of ~2.08× as shown in FIG. 2.

Similarly, playback rates between 1.0 and 2.0 consisting of periods of 1× playback interspersed with jumps of 2 frames. Playback rates <1.0 consist of repeated frames interspersed with 1× frame increments.

ChannelMaster 32× Playback

Figure 3:
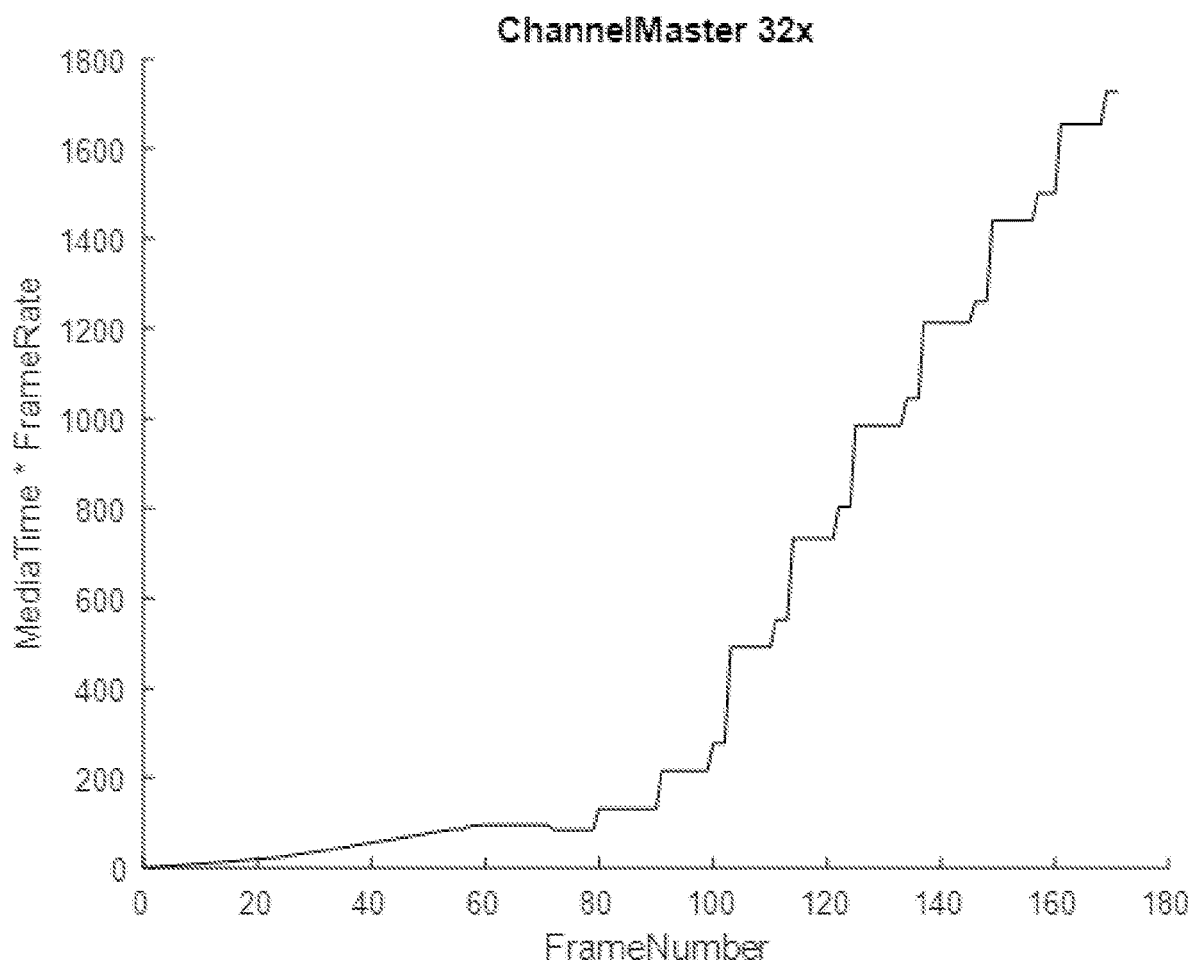

FIG. 3 shows the results of starting 1× playback, then hitting the '>>' button three times in succession, resulting in '1×', '2×', '8×', '32×' playback. Notice that at 32x the pause-seek steps are no longer uniform.

ChannelMaster Skip Ahead/Skip Back

Figure 4:
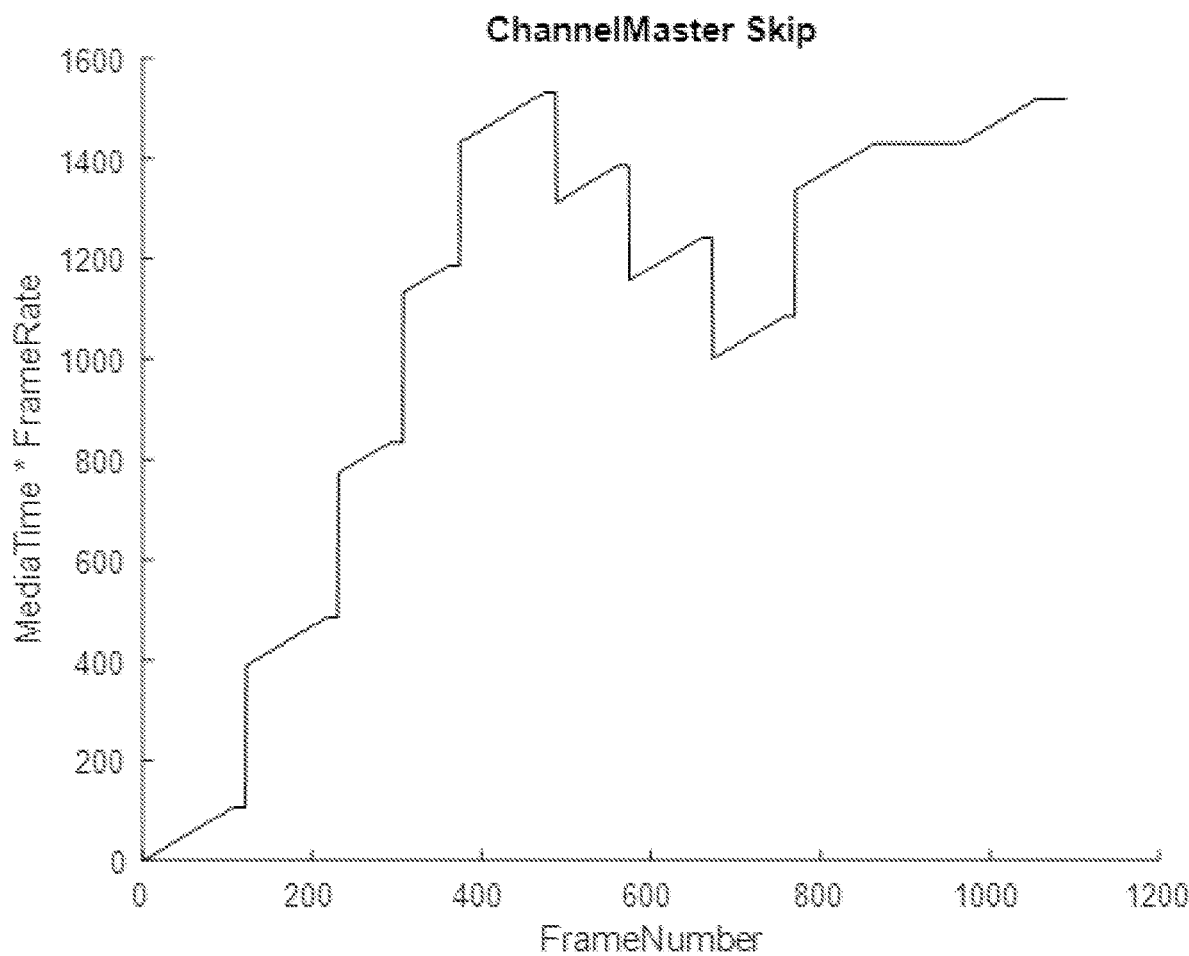
FIG. 4 Illustrates exemplary non-linear timelines resulting from the user's operation of STB remote control trickplay functions in response to a series of 'skip-forward' and 'skip-back' commands, resulting in short pauses prior to the skip, then an immediate return to 1× playback.
Figure 5:
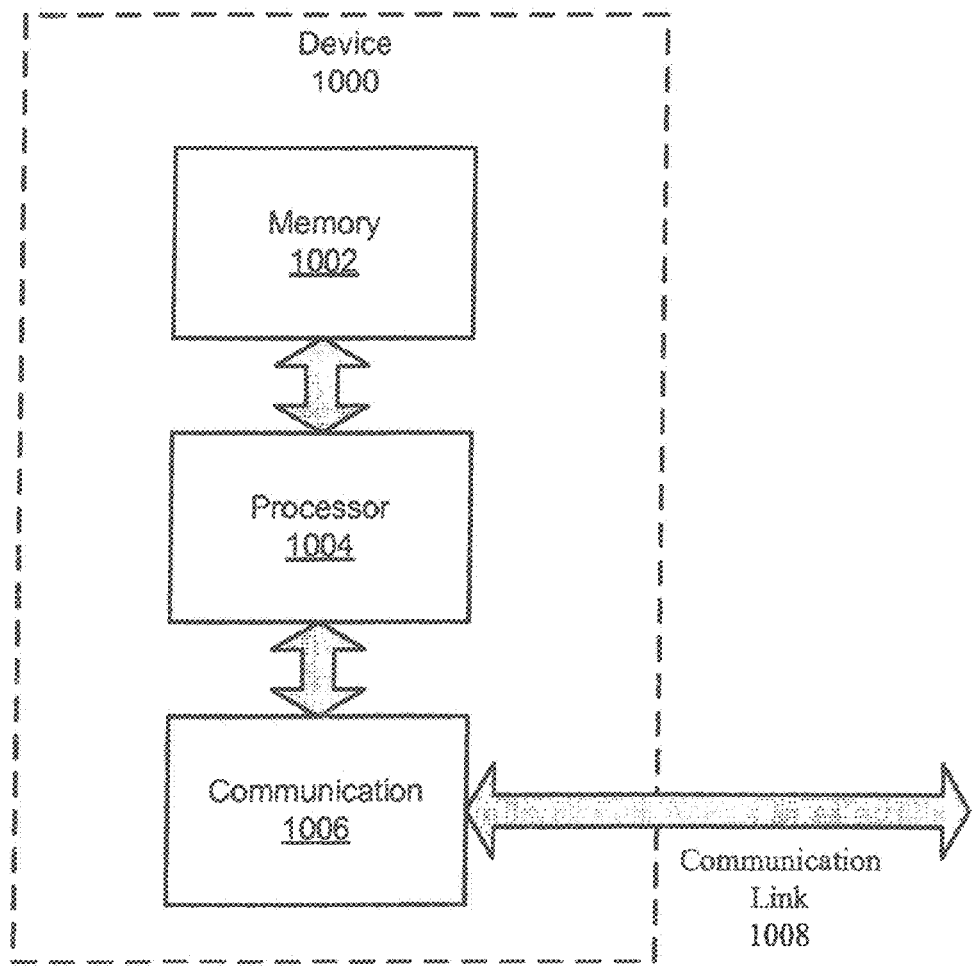
FIG. 5 Illustrates a block diagram of a device that can be used for implementing various disclosed embodiments.

FIG. 4 shows the result of a series of 'skip-forward' and 'skip-back' commands, resulting in short pauses prior to the skip, then an immediate return to 1× playback.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices, and the like. For example, FIG. 4 illustrates a block diagram of a device 1000 within which the various disclosed embodiments may be implemented. The device 1000 comprises at least one processor 1002 and/or controller, at least one memory 1004 unit that is in communication with the processor 1002, and at least one communication unit 1006 that enables the exchange of data and information, directly or indirectly, through the communication link 1008 with other entities, devices and networks. The communication unit 1006 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Referring back to FIG. 4 the device 1000 and the like may be implemented in software, hardware, firmware, or combinations thereof. Similarly, the various components or sub-components within each module may be implemented in software, hardware, or firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method comprising: receiving video content having a video watermark embedded therein; decoding video frames from the received video content; using a Detector Engine to receive the decoded video frames and extract at least a time-offset, a VP1 payload, and a Cyclic Redundancy Check (CRC) field in a plurality of the decoded video frames, wherein the Detector Engine generates an output for the plurality of decoded video frames that includes the time-offset and an interval counter derived from the VP1 payload; and using a Content Timeline Tracker to monitor and analyze the output of the Detector Engine, to produce a piecewise linear approximation of the content timeline, wherein the playback rate changes by a user in an upstream device can be tracked, thereby enabling the playback of auxiliary content which is synchronized to a watermark timeline recovered from the received content when the recovered timeline has a non-linear mapping to real time.

2. The method of claim 1 further comprising using CRC matching logic to compare the CRC fields extracted from the current frame with CRC field extracted from the previous frame and to set a CRC repetition flag to TRUE if they match and otherwise set it to FALSE.

3. The method of claim 2 wherein the CRC matching logic determines if consecutive CRC fields are repeated, wherein this information can be later used to discriminate between actual payload repetition, such as time_offset repetition in high frame-rate video or fragment repetition, or frame repetition in pause-and-seek playback rate change, skip and pause.

4. The method of claim 1 wherein the Content Timeline Tracker analyzes frame_counter, interval_code, time_offset, and CRC repetition flag values to produce estSpeed, a piecewise linear approximation of the content timeline which can track playback rate changes initiated by a user on an upstream device.

5. The method of claim 1 wherein the Content Timeline Tracker implements a state machine to recognize patterns in the recovered timeline and estimate the control segment boundaries.

6. The method of claim 1 wherein the piecewise linear approximation of the content timeline includes an estimate of the playback speed and further comprising using the estimate of the playback speed in controlling a replacement media player, whereby the number of seek commands required to track main content in minimized.

7. The method of claim 1 wherein the content timeline tracker recognizes one or more patterns selected from the group consisting of: initial tracker state; pause; pause seek; oneXOnset; oneXplay; JumpOnset; and Jumping.

* * * * *